United States Patent
Wang

(10) Patent No.: US 9,942,880 B2
(45) Date of Patent: Apr. 10, 2018

(54) TRANSMIT AND RECEIVE APPARATUS AND METHOD

(71) Applicant: Kabushiki Kaisha Toshiba, Minato-ku (JP)

(72) Inventor: Lingfeng Wang, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/421,534

(22) Filed: Feb. 1, 2017

(65) Prior Publication Data

US 2017/0223664 A1 Aug. 3, 2017

(30) Foreign Application Priority Data

Feb. 3, 2016 (GB) .................................. 1601957.2

(51) Int. Cl.
| H04W 72/02 | (2009.01) |
| H04L 27/00 | (2006.01) |
| H04W 72/04 | (2009.01) |
| H04W 72/08 | (2009.01) |

(52) U.S. Cl.
CPC ............. H04W 72/02 (2013.01); H04L 27/00 (2013.01); H04W 72/0453 (2013.01); H04W 72/082 (2013.01)

(58) Field of Classification Search
CPC ...... H04B 17/21; H04W 28/06; H04W 56/00; H04W 56/001; H04W 84/12
See application file for complete search history.

(56) References Cited

U.S. PATENT DOCUMENTS

| 6,714,605 B2 | 3/2004 | Sugar et al. |
| 7,254,191 B2 | 8/2007 | Sugar et al. |
| 7,606,335 B2 | 10/2009 | Kloper et al. |
| 9,118,401 B1 | 8/2015 | Nieto et al. |
| 2008/0279256 A1 | 11/2008 | Zhao et al. |
| 2011/0043710 A1* | 2/2011 | Samarasooriya ..... H03J 1/0091 348/735 |

(Continued)

OTHER PUBLICATIONS

Combined Search and Examination Report dated Sep. 9, 2016 in United Kingdom Patent Application No. GB1601957.2.

(Continued)

Primary Examiner — Bobbak Safaipour
(74) Attorney, Agent, or Firm — Oblon, McClelland, Maier & Neustadt, L.L.P.

(57) ABSTRACT

An apparatus includes a plurality of antennae, one or more receiver chains, non-volatile memory and a signal processor. The non-volatile memory stores instructions for executing by the processor. The processor, when executing the instructions, is configured to determine a first threshold value, apply, to each of a plurality of signals individually received through different antennae, windowing in the frequency domain, and to determine as a windowing result, for individual window frequency positions, a number of data values above the first threshold, to merge the windowing results determined for the individual signals for corresponding windowing positions, to identify as noise bands spectral areas with merged windowing results above second threshold, and to transmit and/or receive signals in spectral bands outside of the noise band spectral areas.

15 Claims, 9 Drawing Sheets

(56) References Cited

U.S. PATENT DOCUMENTS

2011/0164186 A1\* 7/2011 Sadek .................. H04H 20/33
                                                                                       348/724
2011/0228832 A1     9/2011   De Francisco Martin

OTHER PUBLICATIONS

Tien-Yow Liu, et al., "A Spectral Correction Algorithm for I-Q Channel Imbalance Problem", IEEE Globecom, pp. 334-338, vol. 1. Nov. 2001.

\* cited by examiner

TRANSMIT AND RECEIVE APPARATUS AND METHOD

FIELD

Embodiments described herein relate generally to the operation of a transmitter and/or receiver, in particular to the identification of noise bands for the operation of the transmitter and/or receiver.

BACKGROUND

The popularity of WiFi has increased dramatically over recent years. This trend is set to continue. As shown in FIG. 8, different signals appear in the WiFi bands, including Bluetooth signals, Zigbee, microwave oven signals, etc. The presence of these signals may cause inter-system interference and reduce the spectrum usage efficiency. To facilitate an increase in data bandwidth that is inevitably associated with increased use, it is important to increase spectrum usage efficiency. Accurate signal and interference identification in WiFi bands is important as a fundamental driver for achieving this aim. Fading channel condition makes accurately distinguishing between signals and noise very challenging.

BRIEF DESCRIPTION OF THE DRAWINGS

In the following, embodiments will be described with reference to the drawings in which.

DETAILED DESCRIPTION

Figure 1:
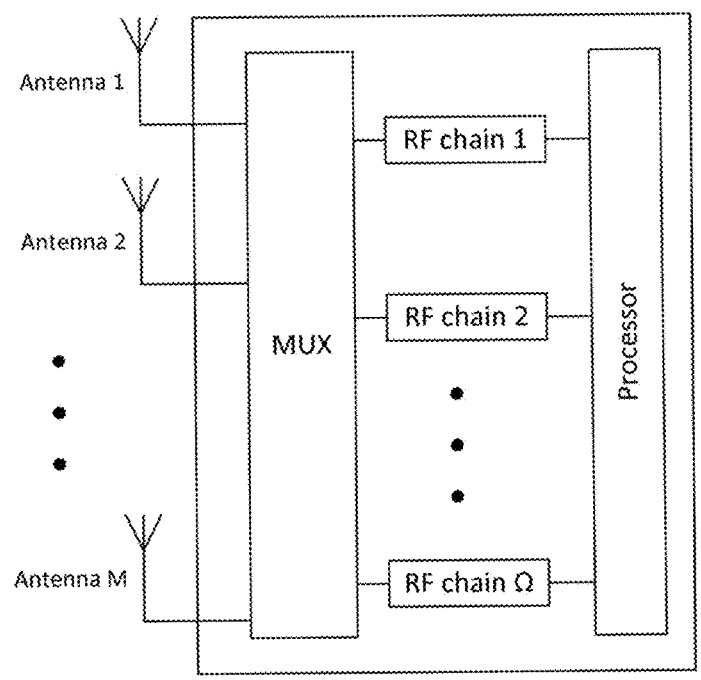
FIG. 1 shows a receiver that can be used in an embodiment.

According to an embodiment an apparatus comprises a plurality of antennae, one or more receiver chains, non-volatile memory and a signal processor. The non-volatile memory stores instructions for executing by the processor. The processor, when executing the instructions, is configured to determine a first threshold value, to apply, to each of a plurality of signals individually received through different antennae, windowing in the frequency domain, and to determine as windowing result, for individual window frequency positions, a number of data values above the first threshold, to merge the windowing results determined for the individual signals for corresponding windowing positions, to identify as noise bands spectral areas with merged windowing results above second threshold and to transmit and/or receive signals in spectral bands outside of the noise band spectral areas.

The apparatus may further be configured to receive the signals using the antennae. A number of receiver chains that is smaller than the number of antenna may be used. In this case the number of signals processed may be limited to the number of receiver chains present. Alternatively the receiver chains can be used to receive signals from individual antennae in a time multiplexed fashion.

A sliding window may be used in applying the windowing.

The instructions may further cause the processor to, when executing the instructions, use a bandwidth threshold to disregard identified noise band spectral areas that have a bandwidth smaller than the bandwidth threshold.

The instructions may further cause the processor to, when executing the instructions, determine a width of the window on the basis of known signal characteristics of a frequency band of interest stored in a memory of the device.

The instructions may further cause the processor to, when executing the instructions, determine the first threshold on the basis of the noise floor.

The instructions may further cause the processor to, when executing the instructions, merge the windowing results by selecting a smallest windowing result as the merged windowing result.

Individual windowing results can be scaled prior to merging. The individual windowing results may, for example, be multiplied by the channel gain prior to merging/selection of the lowest results.

The instructions may cause the processor to, when executing the instructions, determine said bandwidth threshold on the basis of the merged windowing results.

The instructions may cause the processor to, when executing the instructions, determine said bandwidth threshold based on stored characteristics of expected signals.

The instructions may cause the processor to, when executing the instructions, apply said windowing additionally to a signal or to signals received through a same antenna or to same antennae as one or more of said plurality of signals and to include windowing results generated by said windowing in said merging and identifying.

The apparatus may be a base station, an access point or a smart device.

In another embodiment a method of data transmission in an apparatus comprising a plurality of antennae and one or more receiver chains is provided. The method comprises performing, in a signal processor in the apparatus determining a first threshold value, applying, to each of a plurality of signals individually received through different antennae, windowing in the frequency domain, and determining as windowing result, for individual window frequency positions, a number of data values above the first threshold, merging the windowing results determined for the individual signals for corresponding windowing positions, identifying, as noise bands, spectral areas with merged windowing results above second threshold and transmitting and/or receive signals in spectral bands outside of the identified noise band spectral areas.

In another embodiment A non-transient data storage medium comprising computer program instructions that cause, when executed by a processor, the processor to implement any of the aforementioned methods is provided.

Figure 9A:
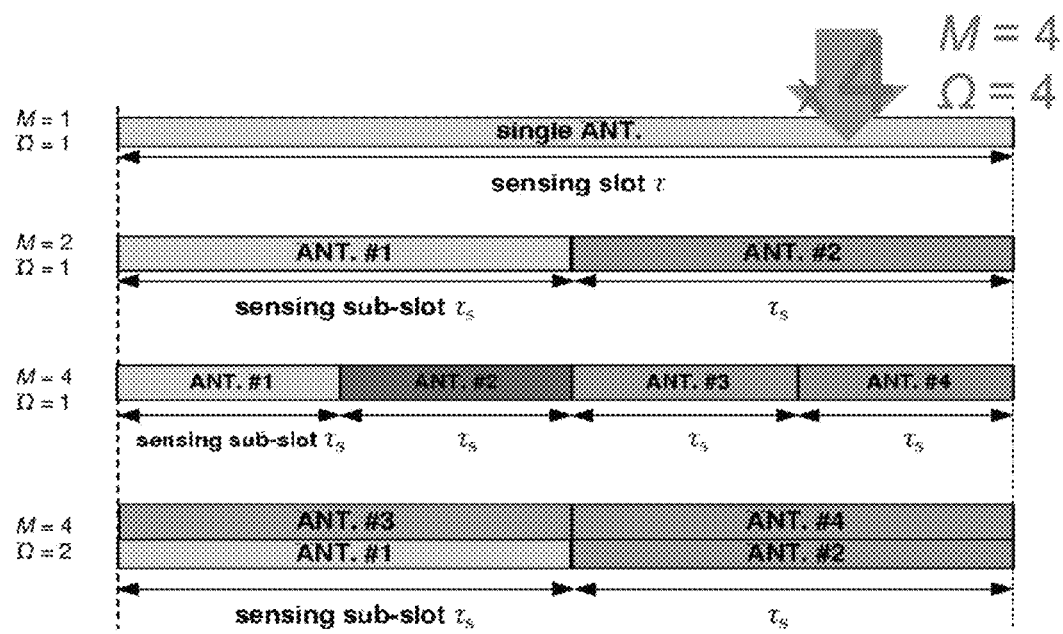
FIG. 9a) shows different ways of receiving multiple signals using multiple antennae.

FIG. 1 shows a receiver equipped with M antennas and Ω RF chains, where M≥Ω. Ω of the M antennas are selected using a multiplexer, MUX. The selected antennas and RF chains receive signals in the same frequency band of interest. The thus received signals are processed by the processor. As is shown in FIG. 9a), if only one receiver chain is available, signals from different antennae can be processed consecutively using this available receiver chain. Alternatively processing can be limited to a number of antennae that corresponds to the number of receiver chains or plural receiver chains may be used to sense signals from a larger number of antennae in a consecutive fashion as is shown in the last example of FIG. 9a).

Figure 2:
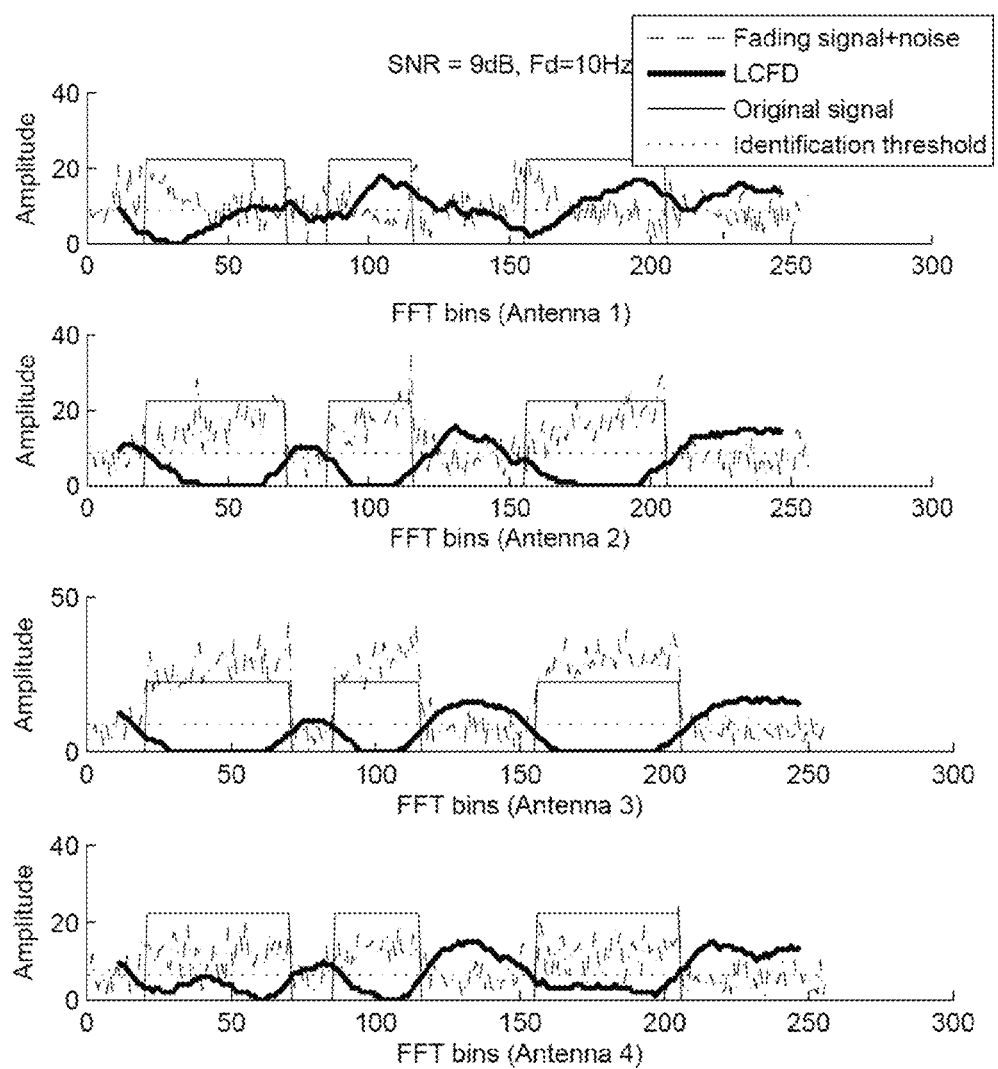
FIG. 2 shows signal spectra received using four separate antenna and receiver chain combination (SNR=9 dB, Doppler Frequency (Fd)=10 Hz)
Figure 4:
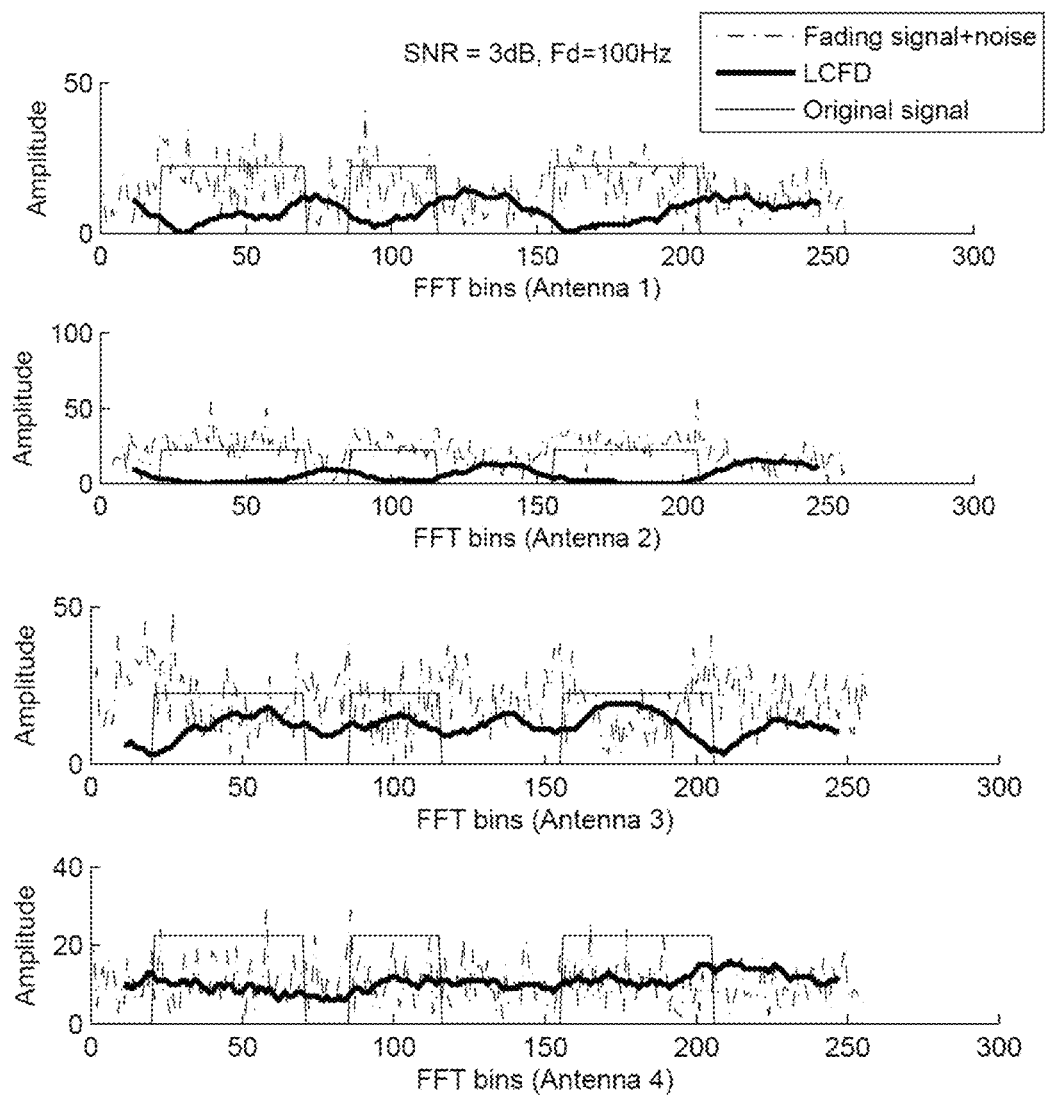
FIG. 4 shows signal spectra received using four separate antenna and receiver chain combination (SNR=3 dB, Doppler Frequency (Fd)=100 Hz)

FIGS. 2 and 4 show FFTs of four simultaneously received signals for an SNR of 9 dB and 3 dB respectively and a Doppler frequency of 10 Hz and 100 Hz respectively. The original signal is indicated in these figures. As can be seen, signal fading and noise cause the received signal to suffer from poor signal to noise ratios. This makes evaluation of the signals or of interfering signal components difficult.

Figure 7:
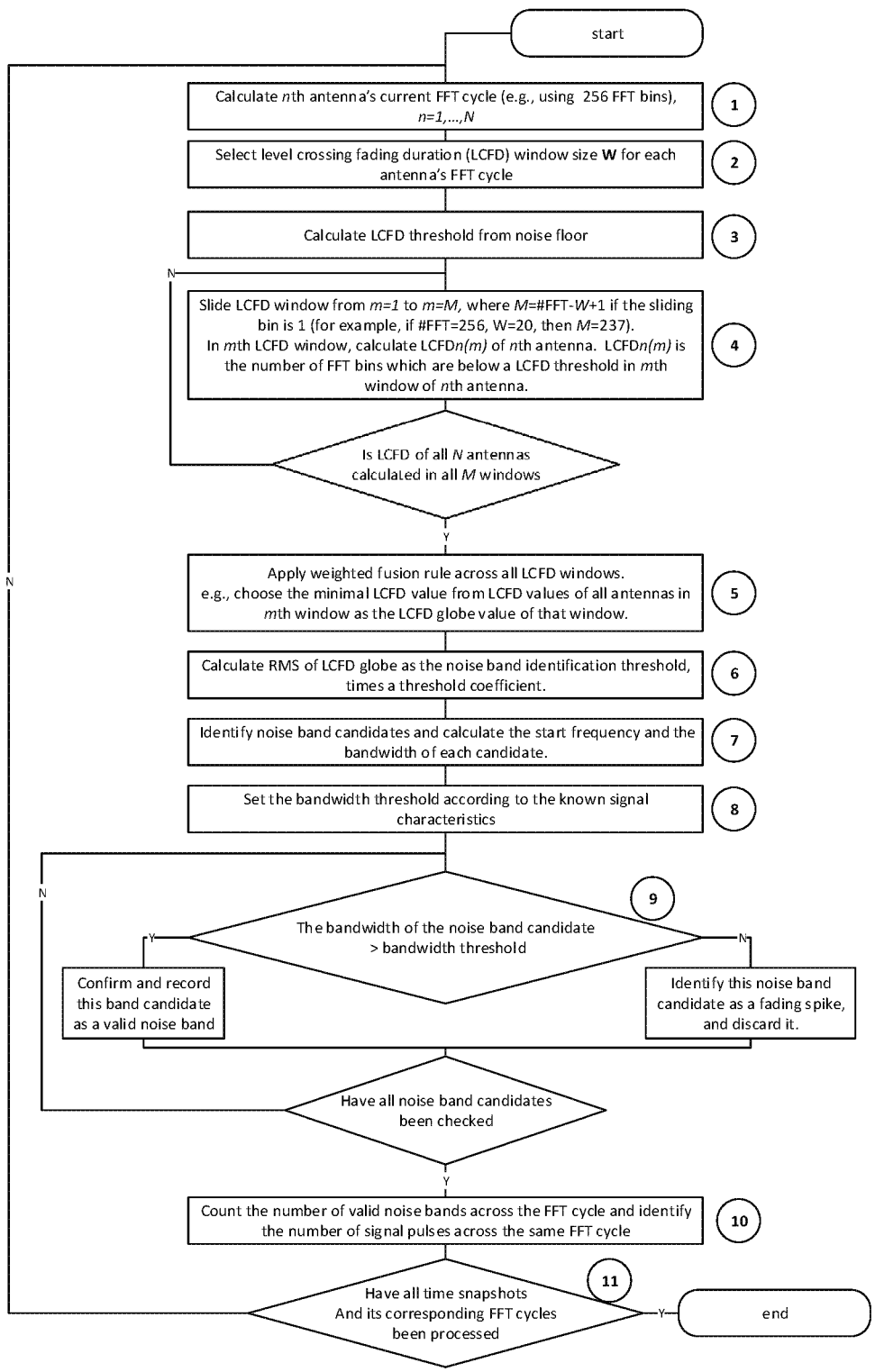
FIG. 7 shows a method according to an embodiment.
Figure 8:
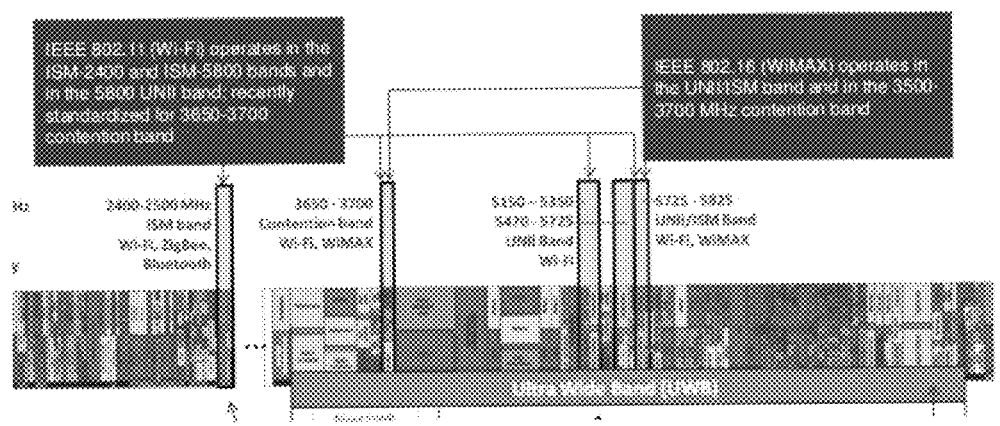
FIG. 8 shows frequency spectra allocation for the WiFi band(s)

FIG. 7 shows a flow chart of an embodiment based on four analysed received signals. It will though be appreciated that it is not essential that four signals be used and that any other number of signals greater than one may be used instead. In particular, the system and method described herein any N antennas and Ω RF chains out of N antennas where N≥Ω. In a first step signals are acquired from the antennae and the Fourier transforms of these signals are computed, generating, for each signal received in the time domain, an FFT signal with frequency bins running from n=1, ..., N. In one example the FFT includes 256 FFT bins.

Figure 9B:
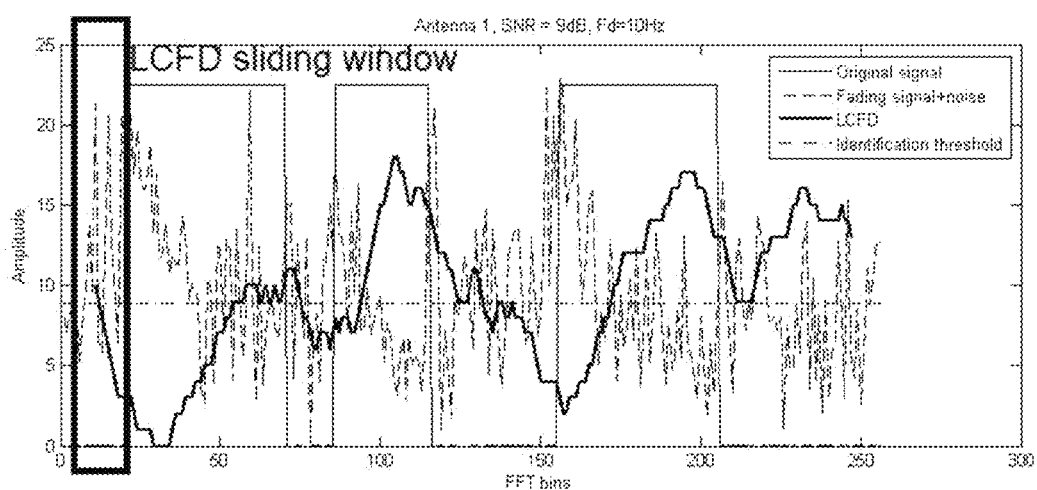
FIG. 9b) illustrates the application of a LCFD sliding window to a signal received from a single antenna.

In step 2 the width W of a level crossing fading window is selected. In one embodiment the window size is identical to the bandwidth of any known or possible interferers. Bandwidths of possible interfering signals may be stored as part of a database in non-volatile memory (not shown) within the receiver. Given that the potential users of bandwidth falling within the WiFi spectrum are known, maintaining a database of this nature is not difficult. In a more preferred embodiment the width W of the level crossing fading window is chosen so that it is ⅔ or, more preferable, ½ of the narrowest bandwidth in this database. A sliding window of this type is shown in FIG. 9b).

In step 3 a level crossing fading duration (LCFD) threshold value is calculated from the noise floor of the signal. This threshold may be the same as the standard deviation of the background noise of the received signals. The thresholds are shown as horizontal lines in FIGS. 2, 4 and 9b). Given that signals received through different antennae can have different noise floors, different thresholds that individually reflect the amount of noise received via the antennae may be applied to different signals in one embodiment.

Whilst the above manner of defining threshold focuses on the frequency domain, in another embodiment, received signals are monitored over a period of time, using, for example, two or more signal snapshots, and a threshold is determined on the basis of the thus observed signal. The threshold is in this embodiment consequently does not only consider the frequency dimension but also takes a second, the time dimension, into account.

In step 4 the LCFD window defined by the width W is applied to a range of consecutive bins of the FFT signal, starting at a highest or lowest frequency component of one of the FFT signals and moving towards the lowest or highest respective ends of the FFT signal in a step by step fashion, taking in, in each step, the next FFT signal bin in the direction of movement of the window and excluding the previously considered FFT signal bin located at the window edge opposite to the direction of window movement. During this process the processor counts the number of FFT signal bins that have a signal intensity that is below the LCFD threshold, so that, for each position of the window a summation value is generated and stored as the LCFD value for the window position under investigation. The line labelled LCFD in FIGS. 2 and 4 is the result of the application of this sliding window to individual ones of the received signals. A sliding window of this nature is applied to every received signal. The LCFD threshold used for assessing the individual signals is shown as a horizontal line labelled 'Identification threshold' against each individual signal in FIGS. 2 and 4. Put in other words, the window is slid across the FFTs of the individual signals from m=1 to m=M, where M=#FFT−W+1 for a sliding bin of 1 (for example, if #FFT=256, W=20, then M=237). In the mth LCFD window, LCFDn(m) of the nth antenna is caclulated. LCFDn(m) is the number of FFT bins which are below a LCFD threshold in the mth window of nth antenna.

It will be appreciated that, if the signal was unencumbered by noise and fading, the number of frequency bins counted below the threshold would be the same as the widths of the sliding window if the sliding window covered only a frequency spectrum that did not include any signal and zero if the sliding window was located on a part of the frequency spectrum that exclusively included signal. Between these two extremes the LCFD value would linearly ramp up or down. However, given that the signal is encumbered by noise, spectral areas that do not include any signal may include frequency bins that nevertheless have a signal strength above the threshold. In this case the LCFD value calculated for a sliding window including such a frequency bin or several of such frequency bins will not be the maximum possible value (as it should be in frequency bands devoid of signal). Fading channel conditions in contrast can lead to a decrease in the received signal strength, so that frequency bins comprising signal may nevertheless have a signal strength that falls below the threshold. In this case the LCFD value calculated for a sliding window including such frequency bins is greater than the optimally expected value of zero. As a consequence noise bands may be miss-identified as frequency band including (possibly interfering) signals. Equally, parts of the frequency spectrum carrying signal may be miss-identified as comprising noise only.

In step 5 of FIG. 7, once the LCFD signals have been calculated for the individually received signals, the LCFD signals are merged into one LCFD signal. In one embodiment this is done by selecting, as the LCFD value for a particular frequency bin, the lowest LCFD value of all signals in the particular frequency bin in question. In this manner, should a particular channel suffer more severely from signal fading than other channels, the LCFD value calculated for this channel for the spectral range affected by fading is ignored, as the fading condition will likely, for the antenna affected by it, have increased LCFD above the corresponding LCFD values calculated for signals received on other antennae.

Alternatively, the four LCFD signal may be combined using a majority rule. In a further alternative embodiment the individual LCFD values are weighted to reflect a property of the received signal before the LCFD values are combined. The individual LCFD values can, for example, be scaled using a noise level (such as the standard deviation of the noise), for example by dividing the LCFD values associated with a particular signal by the standard deviation of the noise. In this embodiment the LCFD values are only combined to form the above mentioned combined LCFD values once the individual values have been scaled in the above described manner.

Figure 3:
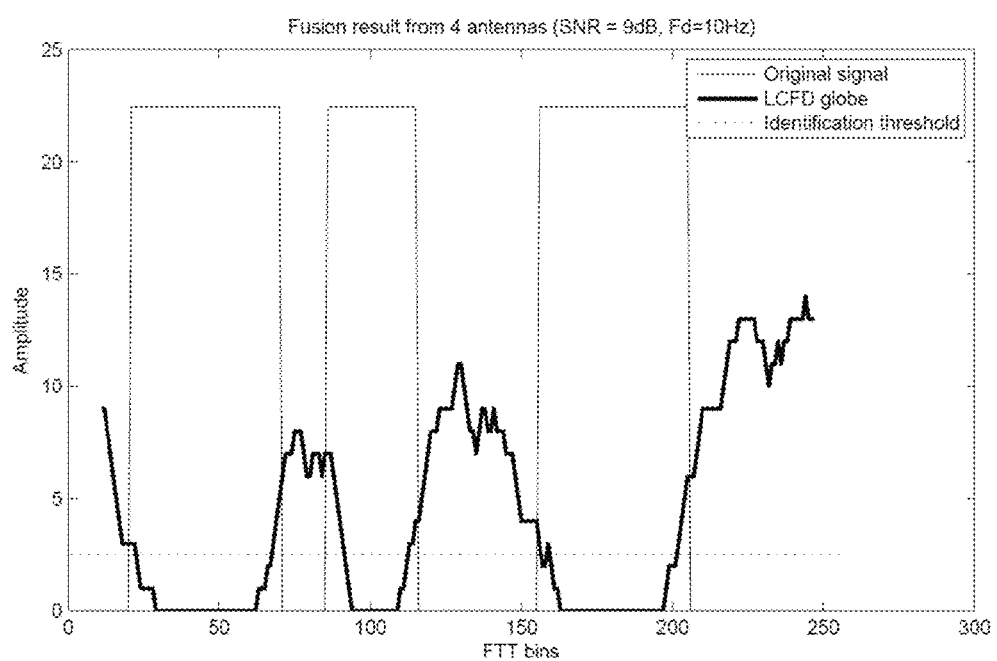
FIG. 3 shows the combination of the four LCFD signals shown in FIG. 2.
Figure 5:
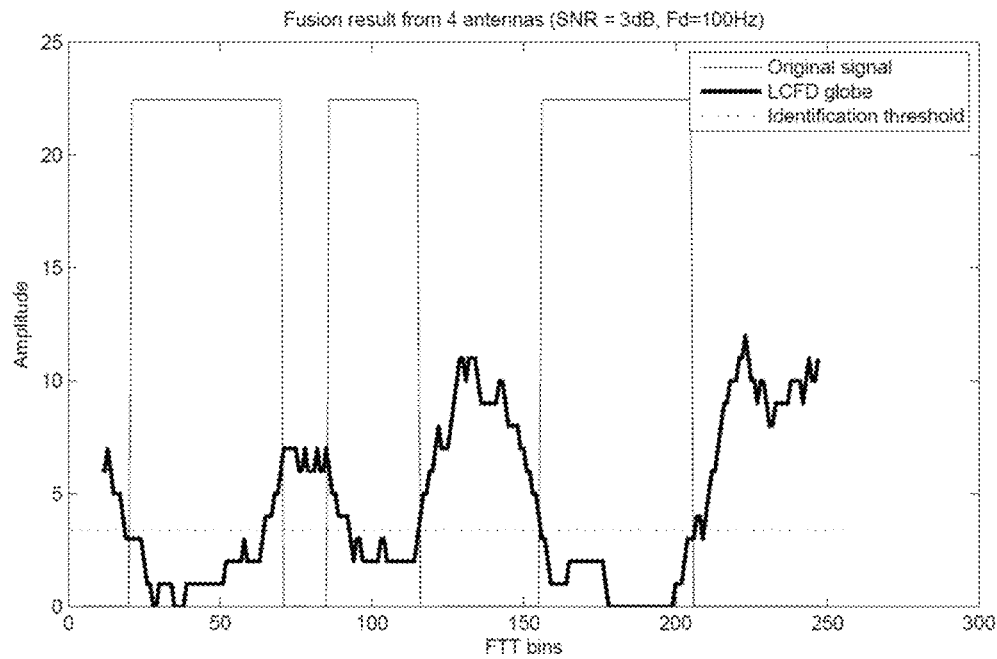
FIG. 5 shows the combination of the four LCFD signals shown in FIG. 4.

FIGS. 3 and 5 show combined LCFD values computed by taking, for each frequency bin, the lowest LCFD value of the four LCFD values of the four signals shown, respectively, in FIGS. 2 and 4.

Figure 9C:
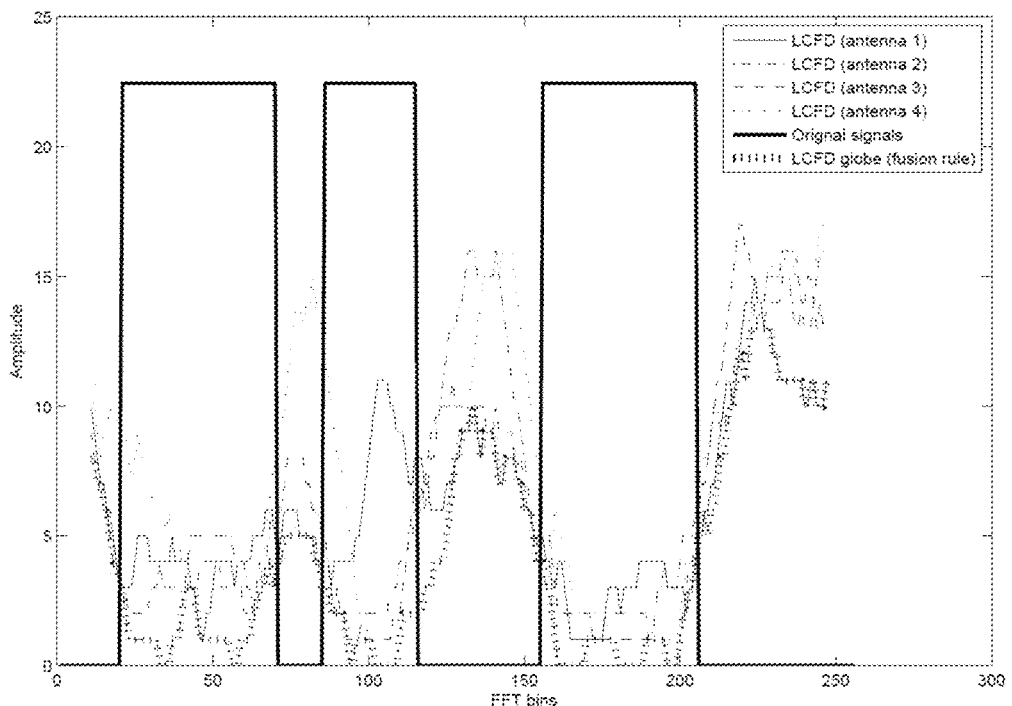
FIG. 9c) shows the combining of LCFD value sets calculated for individual signals into a global LCFD value set.
Figure 9D:
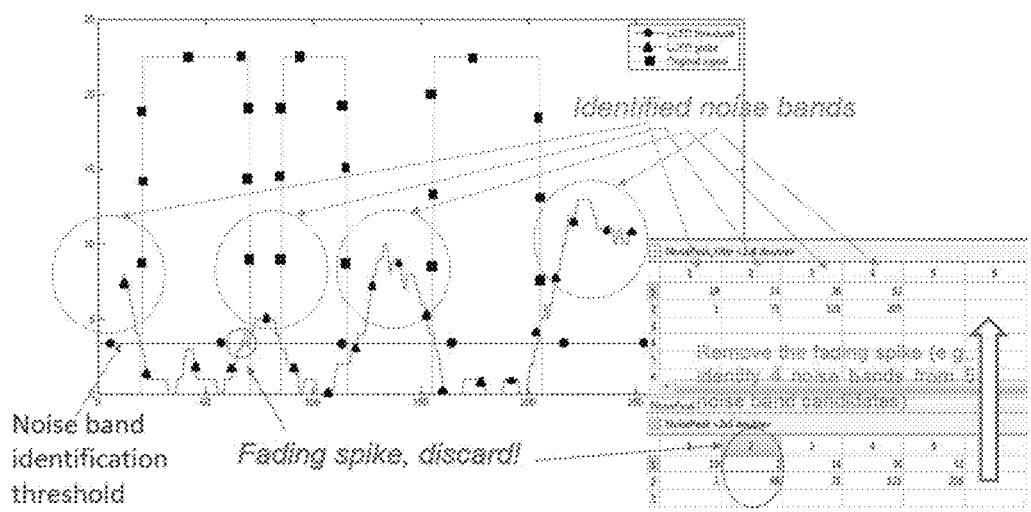
FIG. 9d) shows the identification of signals by setting a noise band threshold and/or bandwidth criteria.

FIG. 9c) shows the LCFD values associated with the individual signals as well as the combined LCFD values. Overlaid over FIG. 9c) is also the original signal. As can be seen and as discussed above, in areas in which original signal would be expected, LCFD values are low more likely than not. Thus, by comparing the combined LCFD values with a further, second threshold values and by selecting those LCFD values that are below the second threshold value, spectral bands likely to include signal can be identified.

Figure 6:
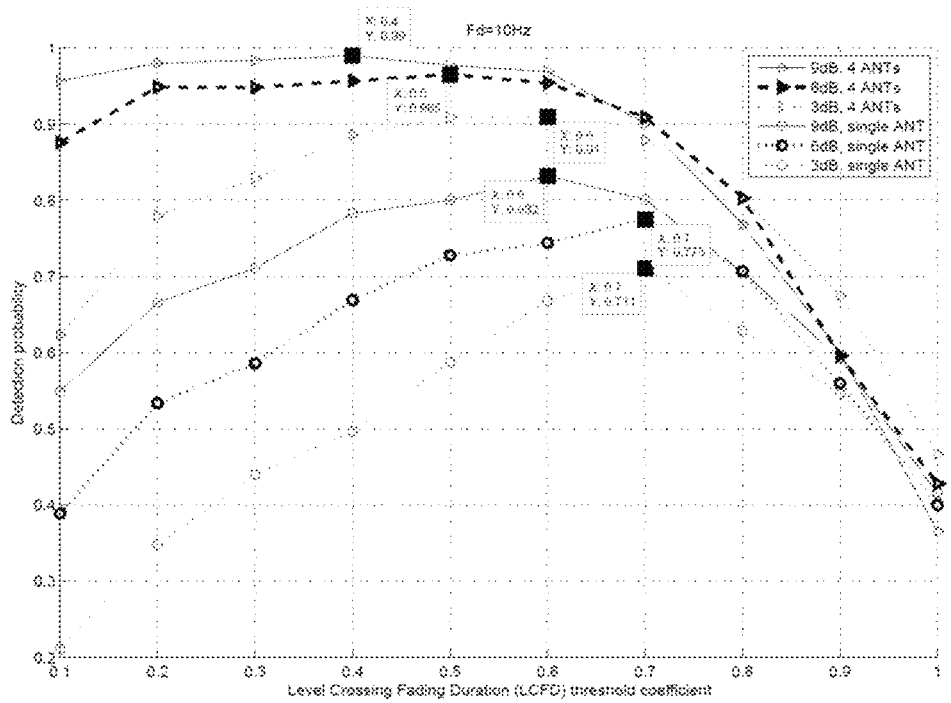
FIG. 6 shows the results of a performance evaluation simulation.

In step 6 of the algorithm illustrated in FIG. 4 the second threshold is calculated. In one embodiment this threshold is calculated as the root means square of all of the combined/global LCDF values across the frequency spectrum under investigation. This threshold can be multiplied with a scaling value stored in non-volatile memory, for example within the receiver. By scaling the RMS of the combined LCDF values in this manner different channel conditions can be accounted for. The scaling values are, in one embodiment, determined by simulation of predetermined channel conditions and then stored in the non-volatile memory of the receiver. Some simulation results forming the basis for choosing scaling values in one embodiment are shown in FIG. 6. It will, moreover, be appreciated that the scaling value can also be one or, in one embodiment, even default to this value. All combined LCDF values falling above the second threshold are identified in step 7 of FIG. 7 as potential noise band candidates and their starting frequency as well as their bandwidth is recorded.

Noise spikes generated by channel fading have a narrower bandwidth than frequency bands that do not contain signal. To identify those noise spikes generated by channel fading the noise band candidates identified in step 7 are further analysed in step 8 and their bandwidth is compared to a bandwidth threshold based on expected bandwidths of known signals (that is signals that are expected to be received at the receiver within a range of expected uncertainty, for example about 10-15%). Those candidates that have a bandwidth that is higher than a threshold bandwidth are then identified as valid noise bands in step 9. Other candidates are identified and discarded as fading spikes.

It will be appreciated that expected bandwidth data stored within the device may be updated to reflect changes in the expected network conditions/usage. Any such updates may be received through the antennae, for example.

After the fading spikes have been eliminated from the set of possible noise spikes the number of possible signal pulses is identified as those spectral areas that fall outside of the noise spikes. The method concludes with a check if all signal snapshots and their corresponding FFT cycles have been processed. Changes in channel conditions due to fading are more rapid than changes caused by signal interference. By checking consecutive signal snapshots in the above described manner it is consequently possible to identify rapidly changing noise spikes as being generated by fading. Such checks are performed in one embodiment.

Some traditional spectrum analysis methods used in communication devices employ a single antenna to identify signal and interference under three criteria of signal power, bandwidth and centre frequency. Known spectrum analysis methods may fail under high noise and/or complicated fading conditions. By using more than one antenna a higher signal identification diversity can be achieved through the above discussed mechanisms. Spectral clarity is moreover improved through the use of the above proposed LCFD criterion and its corresponding detection threshold.

The performance of the system and method discussed herein has been evaluated in a Matlab-based simulator. FIG. 2 shows the spectrum of 4 individual antenna in the condition of SNR=9 dB and Doppler frequency (Fd) of 10 Hz. By applying the above discussed data fusion rule (the rule used was that only the lowest LCFD value for any given FFT bin is selected as the global/combined LCFD value) to combine the LCFD values of all four antennas, the LCFD globe values can be obtained as shown in FIG. 3. This helps to identify the noise only bands and consequently also the signal bands.

FIGS. 4 and 5 show the results of a similar simulation but under worse conditions of a lower SNR and a higher Doppler frequency (i.e., SNR=3 dB and Fd=100 Hz). As can be seen, signals acquired from individual antennae cannot be used in this situation to separate signal from severe fading and noise condition (FIG. 4). The use of the proposed algorithm, however, allows identification of these signals, despite the poor signal properties.

FIG. 6 shows the signal detection probability of the proposed method. As can be seen, a detection gain of 20%-25% can be achieved by the proposed method when compared to individual detection. Different amplitudes of signals do not affect this performance gain.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An apparatus comprising a plurality of antennae, one or more receiver chains, non-volatile memory and a signal processor, the non-volatile memory storing instructions for executing by the processor, the processor, when executing the instructions configured to:
   determine a first threshold value;
   apply, to each of a plurality of signals individually received through different antennae, windowing in the frequency domain, and to determine as a windowing result, for individual window frequency positions, a number of data values above the first threshold;
   merge the windowing results determined for the individual signals for corresponding windowing positions; and
   identify as noise bands spectral areas with merged windowing results above a second threshold;
   transmit and/or receive signals in spectral bands outside of the noise band spectral areas.

2. An apparatus as claimed in claim 1, the instructions further configured to cause the processor to, when executing the instructions, use a bandwidth threshold to disregard identified noise band spectral areas that have a bandwidth smaller than the bandwidth threshold.

3. An apparatus as claimed in claim 1, the instructions further configured to cause the processor to, when executing the instructions, determine a width of the window on the basis of known signal characteristics of a frequency band of interest stored in a memory of the device.

4. An apparatus as claimed in claim 1, the instructions further configured to cause the processor to, when executing the instructions, determine the first threshold on the basis of a noise floor.

5. An apparatus as claimed in claim 1, the instructions further configured to cause the processor to, when executing the instructions, merge the windowing results by selecting a smallest windowing result as the merged windowing result.

6. An apparatus as claimed in claim 2, the instructions further configured to cause the processor to, when executing the instructions, determine said bandwidth threshold on the basis of the merged windowing results.

7. An apparatus as claimed in claim 2, the instructions further configured to cause the processor to, when executing the instructions, determine said bandwidth threshold based on stored characteristics of expected signals.

8. An apparatus as claimed in claim 1, the instructions further configured to cause the processor to, when executing the instructions, apply said windowing additionally to a signal or to signals received through a same antenna or to same antennae as one or more of said plurality of signals and to include windowing results generated by said windowing in said merging and identifying.

9. An apparatus as claimed in claim 1, wherein the apparatus is a base station, an access point, a smart device or a wireless access point capable of scanning signals in the environment.

10. A method of data transmission in an apparatus comprising a plurality of antennae and one or more receiver chains, the method comprising performing, in a signal processor in the apparatus:
   determining a first threshold value;
   applying, to each of a plurality of signals individually received through different antennae, windowing in the frequency domain and determining as a windowing result, for individual window frequency positions, a number of data values above the first threshold;
   merging the windowing results determined for the individual signals for corresponding windowing positions;
   identifying as noise bands spectral areas with merged windowing results above a second threshold; and
   transmitting and/or receive signals in spectral bands outside of the identified noise band spectral areas.

11. A method as claimed in claim 10, further comprising using a bandwidth threshold to disregard identified noise band spectral areas that have a bandwidth smaller than the bandwidth threshold.

12. A method as claimed in claim 10, further comprising determining the first threshold on the basis of a noise floor.

13. A method as claimed in claim 10, further comprising merging the windowing results by selecting a smallest windowing result as the merged windowing result.

14. A method as claimed in claim 11, further comprising determining said bandwidth threshold on the basis of the merged windowing results.

15. A non-transient data storage medium comprising computer program instructions that cause, when executed by a processor, the processor to implement the method in claim 10.

* * * * *